United States Patent [19]
Brown

[11] 3,727,959
[45] Apr. 17, 1973

[54] ELLIPTICAL GEAR DRIVE FOR BUNDLE TYING MACHINE

[75] Inventor: Robert G. Brown, Glenwood, Md.

[73] Assignee: B. H. Bunn Company, Alsip, Ill.

[22] Filed: Feb. 16, 1972

[21] Appl. No.: 226,722

[52] U.S. Cl. ................................................. 289/15
[51] Int. Cl. .......................................... B65h 69/04
[58] Field of Search .................................. 289/2, 15

[56] References Cited

UNITED STATES PATENTS 933,126  9/1909  Sharp ................................. 289/15
3,248,139  4/1966  Bledsoe .............................. 289/15

*Primary Examiner*—Louis K. Rimrodt
*Attorney*—James A. Davis et al.

[57] ABSTRACT

A drive for the twine arm and knotter of a bundle typing machine which uses a continuously connected drive for both the twine arm and knotter. The twine arm, however, is relatively immobile when the knotter is operating and the knotter is relatively immobile when the twine arm is operating. This effect is achieved by connecting the two drives with elliptical gears.

5 Claims, 3 Drawing Figures

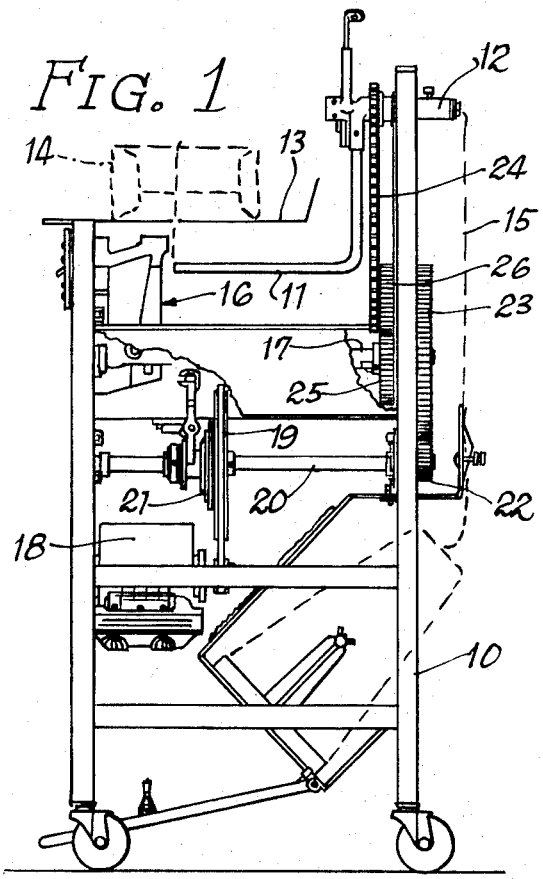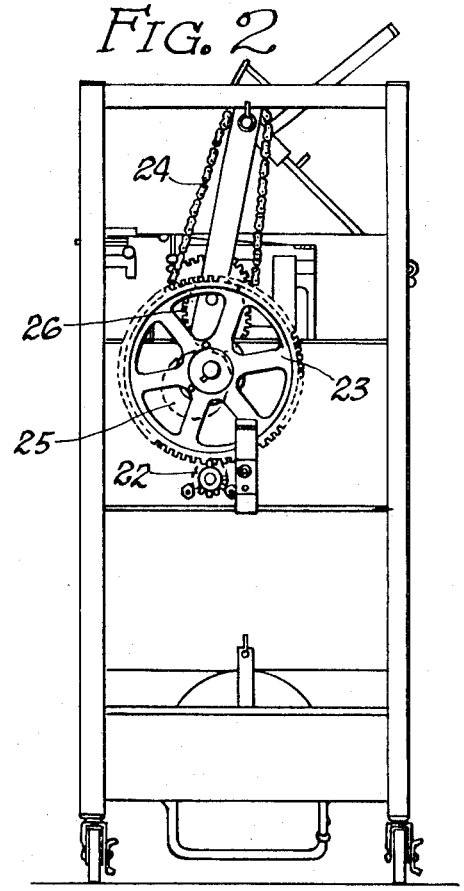

ELLIPTICAL GEAR DRIVE FOR BUNDLE TYING MACHINE

This invention relates to a drive mechanism for the twine arm and knotter of a bundle tying machine.

In my prior U.S. Pat. No. 3,540,765 dated Nov. 17, 1970, for "Intermittent Drive for Tying Machine Twine Arm," there is disclosed a common drive for the twine arm and knotter mechanisms of a bundle tying machine which employs conjugate cams to drive the twine arm from a motor driven shaft. In the normal operation of a bundle tying machine the twine arm and knotter operate sequentially so that while the twine arm is wrapping twine around a bundle, the knotter is inoperative and becomes operative only after the twine arm has completed its function. During the knotting function, the twine arm is held stationary.

In the aforementioned patent U.S. Pat. No. 3,540,765 the conjugate cams are so designed as to provide a dwell for the twine arm after it has completed its function. The dwell also holds the twine arm against rotation so that the starting position for the next cycle of the arm can be predetermined.

It has been found, however, that the cost of the conjugate cams is greater than is desirable and more than offsets the benefits of smoother and faster operation which the cams make possible and hence it is an object of this invention to provide a drive for the twine arm and knotter of a bundle tying machine which will retain the smoothness and speed of the conjugate cam drive, but which will be simpler and less expensive to make.

As a more specific object, this invention has within its purview the provision of a constant mesh gear drive for the twine arm of a tying machine which converts the constant speed of a drive shaft to a variable speed in the driven shaft such that at the lowest speed of the driven shaft the movement of the twine arm driven thereby is almost negligible and hence such lowest speed is made to occur during the knotting cycle of the machine which normally occurs after the twine arm has completed its function.

In the form selected to illustrate this invention the variable speed drive is comprised of a pair of intermeshing elliptical gears, one of which is driven at a constant angular speed by substantially constant speed drive shaft and the other of which is connected through a two-to-one gear reduction to the twine arm to provide a double wrap for the twine arm for each tying cycle.

In the accompanying drawings in which the preferred form of this invention is illustrated:

FIG. 1 is a side elevation of a tying machine in which the twine arm drive of this invention is incorporated;

FIG. 2 is a rear view of the tying machine of FIG. 1; and

Figure 3:
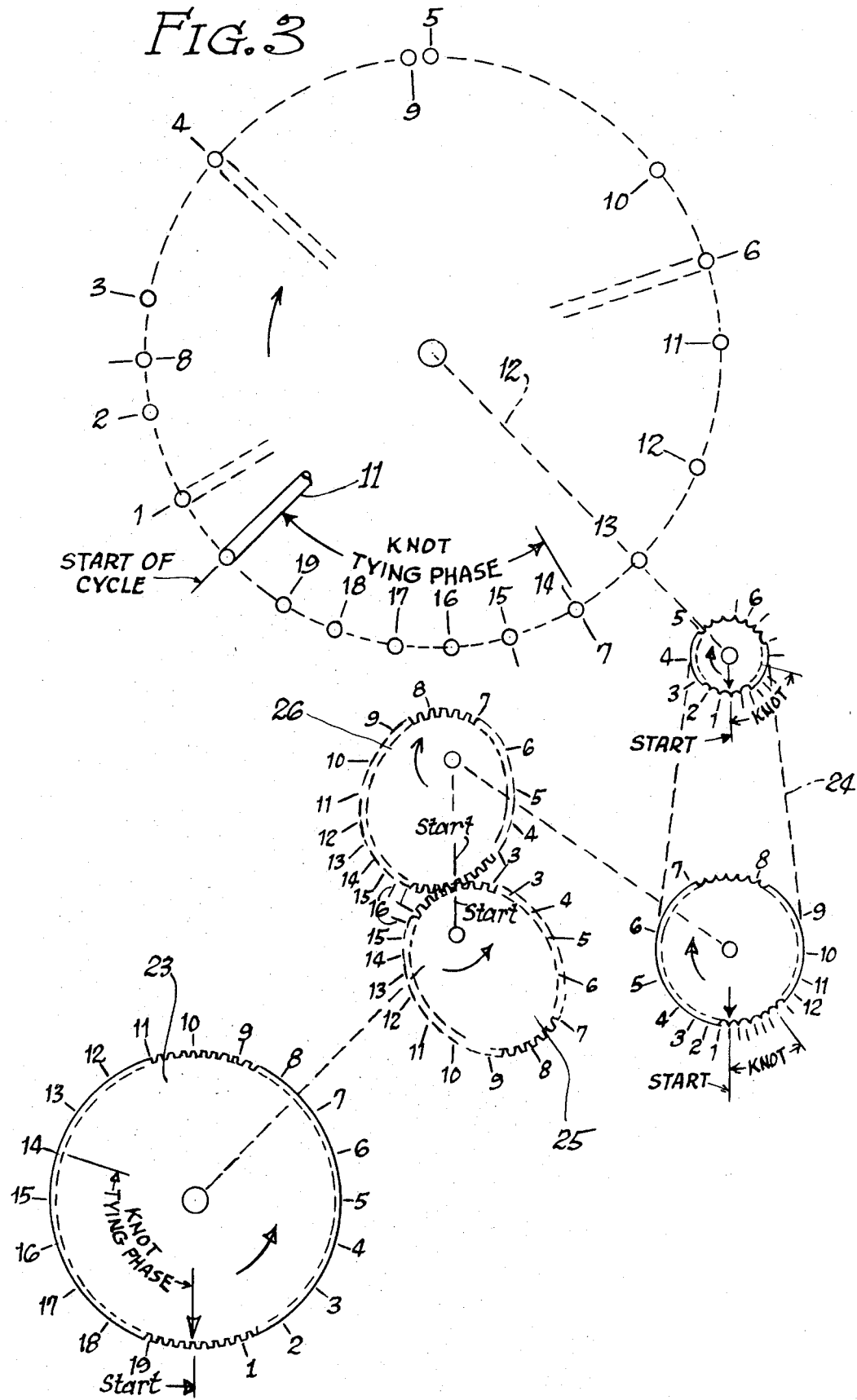
FIG. 3 is a kinematic diagram of the entire drive for the twine arm.

Referring now to the drawings for a detailed description of the invention, a tying machine in which the drive has been installed is shown in FIGS. 1 and 2. Said machine is comprised of a frame 10 on which is mounted a twine arm 11 secured to a horizontal shaft 12. A table is shown at 13 on which is placed a bundle 14, which is to be tied with a double wrap of a twine 15, both the bundle and twine being shown in dotted lines. It is understood that in place of twine made of hemp cotton or the like, a tape made of nylon or other known fastening means may be employed. It is also understood that the machine may be designed to make a single wrap, or any desired number of wraps, in place of the double wrap referred to above.

A knotter is shown schematically at 16 and the drive shaft therefor at 17. Said knotter may be of the kind disclosed in B. H. Bunn U. S. Pat. No. 1,994,453 dated Mar. 19, 1935. As there disclosed, the drive shaft rotates continuously throughout the tying cycle, the actual knot-forming function being performed after the twine arm has completed the desired number of wraps of twine around the bundle to be tied.

Power for driving twine arm 11 and knotter drive shaft 17 is supplied by an electric motor 18 which drives a pulley 19 adapted to be connected to a drive shaft 20 by a manually tripped clutch 21. Drive shaft 20 has a pinion 22 which meshes with a driven gear 23 keyed to knotter drive shaft 17, drive gear 23 being larger than pinion 22 to provide a speed reduction in shaft 17.

Twine arm shaft 12 is driven by a chain and sprocket drive 24. The latter in turn is driven from knotter drive shaft 17 through a pair of intermeshing elliptical gears 25,26 which, as will be seen hereinafter, provide the desired variation in angular speed between knotter drive shaft 17 and twine arm drive shaft 12.

Referring now to FIG. 3, gear 23 which drives the knotter drive shaft 17 is shown in the lower left-hand corner of the Figure. Said drive gear 23 rotates at a constant speed and for purposes of analysis is shown divided into 20 equal numbered segments with "Start" as the 20th element. Since elliptical gear 25 is driven directly by shaft 17, said elliptical gear will likewise be driven at a constant angular speed. The corresponding segments are indicated in the marginal regions of the elements driven by gear 23 and may be considered as stationary dials which are swept by an indicator on each element labeled "Start." The distance between adjacent numbers corresponds to the distance travelled by the indicator per unit of time. For purposes of illustration, it may be assumed that drive gear 23 rotates at a speed of one revolution per second and hence the time interval between adjacent members is 1/20 second.

At the start of a bundle tying cycle, which includes a twine-wrapping phase and a knot-tying phase, the twine arm is below the table 13 on which bundle 14 rests. As viewed in FIG. 3, twine arm 11 rotates clockwise and for illustrative purposes will be described as wrapping the twine around the bundle twice so that it will make two revolutions for each revolution of drive gear 23. In the relative position of elliptical gears 25 and 26 shown in FIG. 3, and a counterclockwise rotation thereof, drive gear 26 is on the accelerating side of its rotation, and it will continue to accelerate for the next seven time units, i.e., for 7/10s of a second. This, as shown by the corresponding segments around the twine arm circle, will carry the twine arm through approximately 300° of its first wrap. When the point of maximum acceleration is passed between points 7 and 8 on gear 26, said gear will decelerate until it reaches a point between points 16 and 17 at which the axes of the elliptical pitch circles of gears 25 and 26 are aligned. However, from approximately point 14 to the starting point, which would be point 20, the arm describes an angle of approximately 75° in six unite of time, or 6/10 of a second. It is during this time that the knot-tying phase of the twine-wrapping operation takes place. The slow continued rotation of the twine arm during the knot-tying phase has no adverse effect upon the latter since at that time the twine is held frictionally by a button at the knotter (not shown).

The cycle is automatically terminated as in the aforementioned Bunn machine, by disconnecting clutch 21 and applying a brake (not shown) to twine arm 11.

Thus by the use of a pair of elliptical gears, the twine arm of a bundle tying machine can be driven by constantly meshed gears, and yet the arm will not move sufficiently during the knot-tying phase to disturb the normal functioning of the machine. The twine arm is accelerated and decelerated smoothly, and each tying operation can be initiated from the same position of the arm thus to insure proper phasing of all operations.

I claim:

1. A bundle tying machine having a rotatable twine arm and a knotting mechanism, a drive shaft connected to drive the knotting mechanism, and constant mesh gear means connected between the drive shaft and the twine arm to drive the twine arm from said drive shaft simultaneously with said knotting mechanism, said constant mesh gear means providing a variable speed drive to the twine arm while the knotter is driven at constant speed.

2. A bundle tying machine as described in claim 1, said constant mesh gear means comprising a pair of intermeshing elliptical gears, a countershaft, one of said pair of intermeshing elliptical gears being mounted for rotation with said drive shaft, the other of said pair of intermeshing elliptical gears being mounted for rotation on said countershaft, and means driving said twine arm from said other of said pair of intermeshing elliptical gears.

3. A bundle tying machine as described in claim 2, the elliptical gears being angularly related to the drive for the twine arm in a manner to drive the twine arm at a maximum speed during the middle of its twine tying cycle.

4. A bundle tying machine as described in claim 2, said machine comprising further a table, said twine arm being rotatable around said table in a vertical plane, and said elliptical gears being angularly related to the drive for the twine arm in a manner to drive the twine arm at a minimum speed when said twine arm passes under the table in the final phase of its twine tying cycle.

5. A bundle tying machine as described in claim 2, said machine comprising further a table, said twine arm being rotatable around said table in a substantially vertical plane, and said elliptical gears being angularly related to the drive for the twine arm in a manner to drive the twine arm at a minimum speed when said twine arm passes under said table in the final phase of its twine tying cycle, said knotter mechanism being driven during said final phase of the tying cycle of the twine arm.

* * * * *